ELECTRICAL APPARATUS AND METHOD OF FABRICATING IT

Filed March 8, 1968 5 Sheets-Sheet 1

INVENTORS.
EDGAR O. SPRUDE
WILBUR E. HESS
BY
Samuel Kane
ATTORNEY

ELECTRICAL APPARATUS AND METHOD OF FABRICATING IT

Filed March 8, 1968 5 Sheets-Sheet 2

INVENTORS.
EDGAR O. SPRUDE
WILBUR E. HESS
BY Samuel Kane
ATTORNEY

ELECTRICAL APPARATUS AND METHOD OF FABRICATING IT

INVENTORS.
EDGAR O. SPRUDE
WILBUR E. HESS
BY
Samuel Kane
ATTORNEY

INVENTORS.
EDGAR O. SPRUDE
WILBUR E. HESS
BY
Samuel Kane
ATTORNEY

INVENTOR.
EDGAR O. SPRUDE
WILBUR E. HESS
BY
Samuel Kane
ATTORNEY

United States Patent Office 3,505,570

Patented Apr. 7, 1970

3,505,570

ELECTRICAL APPARATUS AND METHOD OF FABRICATING IT

Edgar O. Sprude, 1996 Upland Way, Philadelphia, Pa. 19031, and Wilbur E. Hess, 22 Selwyn Drive, Broomall, Pa. 19008

Filed Mar. 8, 1968, Ser. No. 711,765
Int. Cl. H02b 1/04, 9/00
U.S. Cl. 317—101 9 Claims

ABSTRACT OF THE DISCLOSURE

A flexible sheet of electrical insulating material having conductors on both sides is folded about and bonded to a carrier frame of electrical insulating material. Electrical components are inserted into the carrier frame and electrically connected to conductors on the flexible sheet. A pluggable header is connected to the electrical components, and the assembly is encased in an encapsulating material.

Background of the invention

This invention relates generally to electrical apparatus and to methods of fabricating such apparatus, and more particularly to improvements in pluggable electrical modules and to a method of fabricating such modules. The invention provides improvements in electrical apparatus similar, in certain respects, to the kind shown in U.S. Patent 2,929,964, issued in the name of J. E. Rhys-Jones.

Summary of the invention

An object of the invention is to provide improvements in electrical apparatus and in methods of packaging electrical components of such apparatus.

Another object of the invention is to provide improvements in electrical apparatus of modular form and in methods of packaging the electrical modules.

A further object of the invention is to provide electrical or electronic apparatus which readily lends itself to automatic assembly.

Still a further object of the invention is to provide such apparatus in which the task of making wiring connections is greatly simplified.

More specifically, it is another object of the invention to provide an elongate electrical apparatus in which connections can easily be made from either end of one component, located at one end of the apparatus, to either end of another component located at the other end of the apparatus.

Another, more specific, object of the invention is to provide a double-sided printed circuit sheet which may be fabricated more economically by known printed circuit techniques, in that it only requires a single layout, one set of negatives, and only one printing and etching operation.

Still another object of the invention is to provide a modular construction for electrical and electronic assemblies which is simple to fabricate and inexpensive to manufacture.

In accordance with the above objects and considered first in one of its broader aspects, the invention is an improvement in electrical or electronic apparatus having a carrier frame for supporting electrical components having wire leads, and in which the frame has a channel-shaped section which comprises a base, legs extending from the base, and elongate notches in marginal edges of the legs for receiving the wire leads of the electrical components. The improvement comprises a foldable sheet of electrical insulating material provided with a plurality of elongate openings and with flat conductors on both sides of the sheet, and with certain of the conductors having a terminal adjacent to one of the openings. Means is provided for electrically connecting certain of the conductors on one side of the sheet individually to a conductor on the other side of the sheet, and further means is provided for bonding the sheet in a folded condition to the channel-shaped section so that it substantially covers at least some of the major surfaces of the channel-shaped section and so that the openings are in line with corresponding ones of the notches to thereby position the terminals adjacent to the notches for connection to the leads.

The method of the invention, in one of its broader aspects, involves the farbrication of electrical apparatus by providing the steps of forming a carrier frame with a channel-shaped section which has a base, legs extending from the base, and elongate notches in marginal edges of the legs for receiving the wire leads of electrical components to be supported in the frame, forming an electrical insulating foldable development with a plurality of elongate openings and with flat foldable conductors on both sides of the development, and with certain of the conductors having a terminal adjacent to one of the openings and certain of the conductors on one side of the development being electrically connected individually to a conductor on the other side of the development, and folding the development about the carrier frame and bonding it to the carrier frame so that it substantially covers at least some of the major surfaces of the channel-shaped section and so that the openings are in line with corresponding ones of the notches to thereby position the terminals adjacent to the notches for connection to the leads.

The invention will be more clearly understood when the detailed description of the preferred embodiment, which follows shortly, is read in conjunction with the accompanying drawings which are described below.

Description of the preferred embodiment

Figure 1:
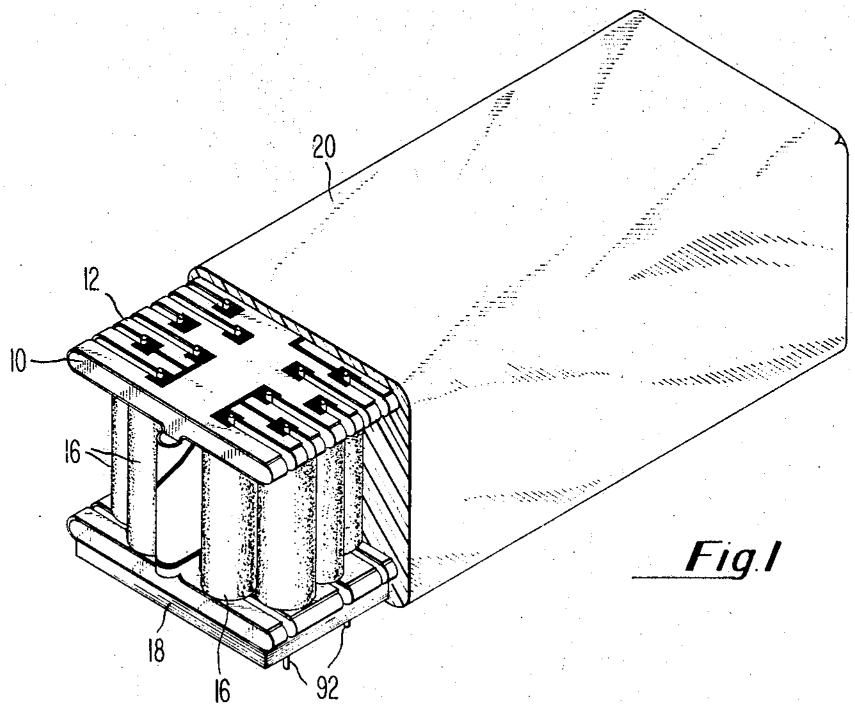
FIG. 1 is an isometric view of an electrical apparatus, constructed in accordance with the invention, with a portion of encapsulating material omitted to reveal interior parts.
Figure 2:
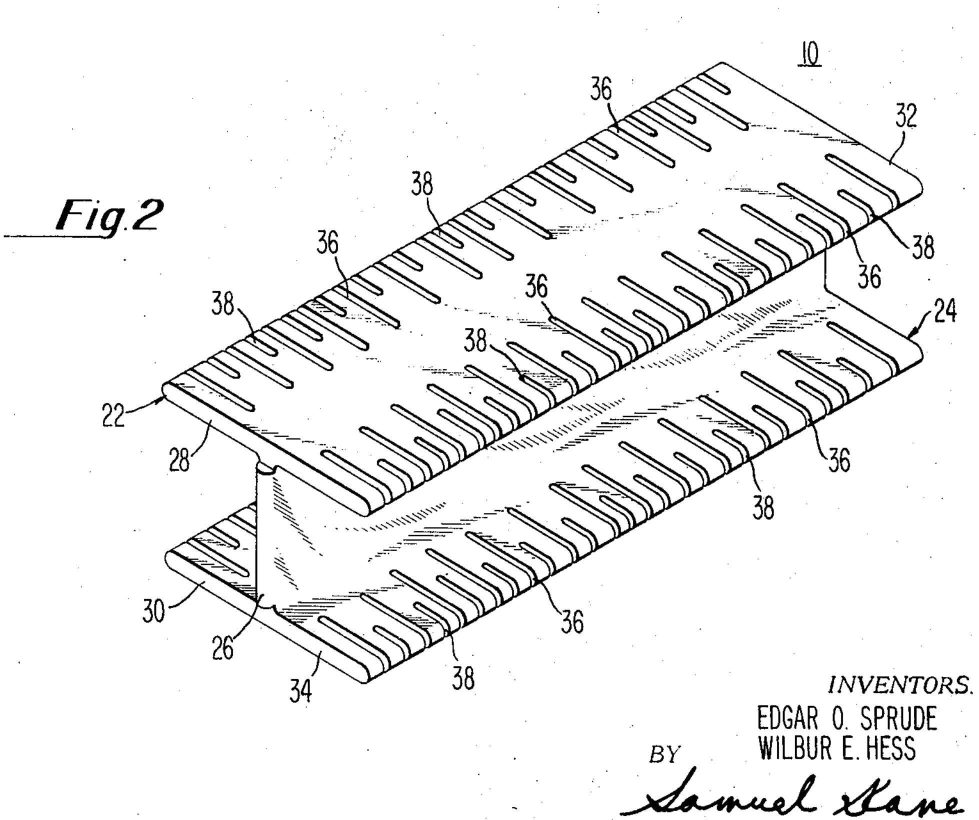
FIG. 2 is an isometric view of a carrier frame member of FIG. 1.
Figure 3:
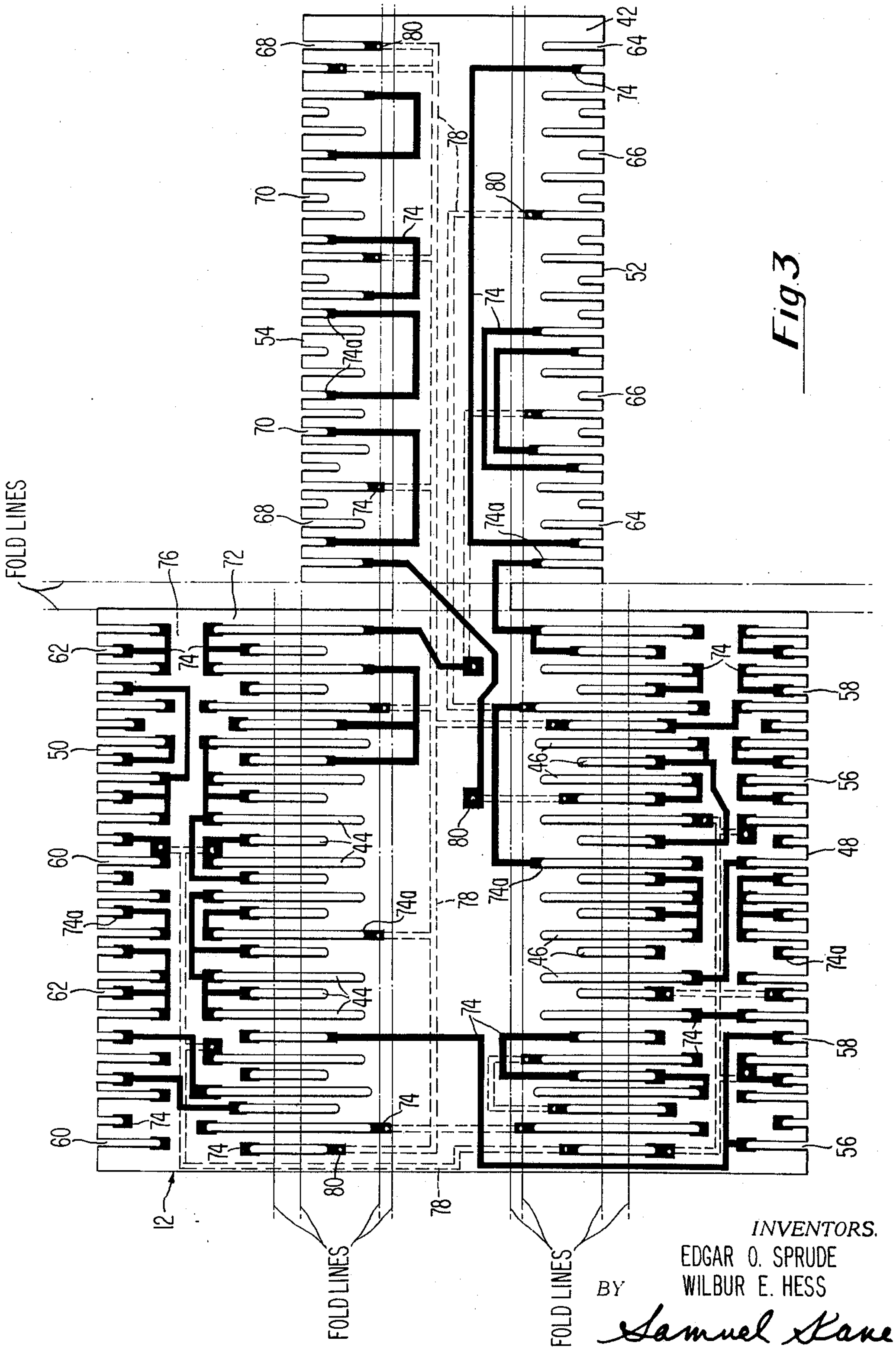
FIG. 3 is a developed view of a foldable sheet circuit member of FIG. 1.
Figures 4, 5, 6, 7, 8:
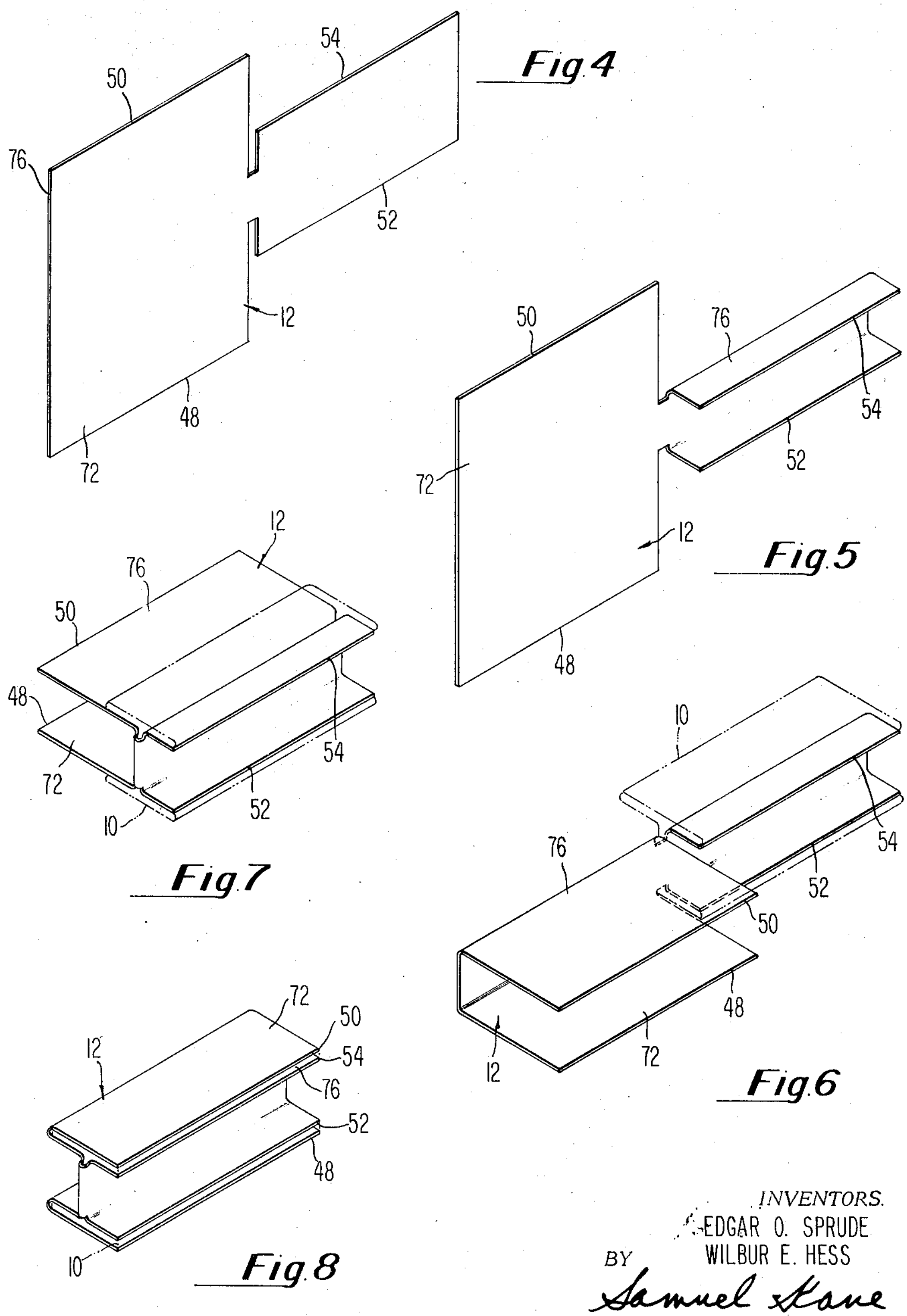
FIGS. 4–8 illustrate one method of folding the sheet of FIG. 3 in the process of folding it about the carrier frame.
Figure 9:
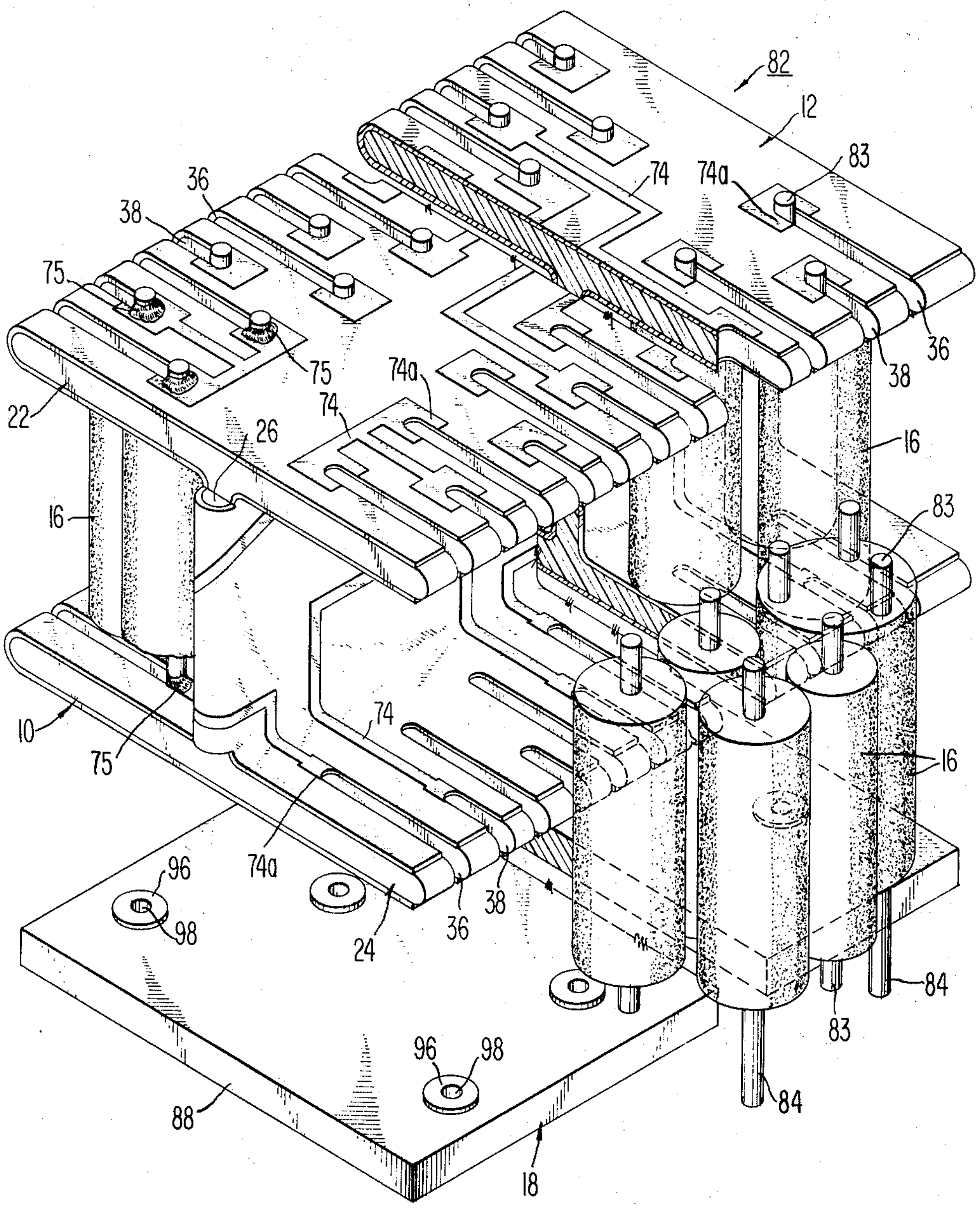
FIG. 9 is an isomeric partially exploded view of certain elements of the apparatus of FIG. 1.

Turning now to the details of the drawings, the apparatus includes a carrier frame 10 (FIG. 2), a foldable sheet or development 12 (FIG. 3) provided with circuitry on both sides, and a suitable means, such as an electrical insulating adhesive 14 (FIG. 12) for holding the sheet 12 in a folded condition against the carrier frame 10. The apparatus further includes electrical component 16 (FIGS. 1, 9 and 10) such as resistors, transistors, capacitors, inductors, etc., which are located and supported in the carrier frame 10 and electrically connected to circuitry on the sheet 12. The apparatus further includes a pluggable header 18 (FIG. 9) and is preferably encased or encapsulated in a suitable electrical insulating encapsulating material 20 (FIG. 1), so as to leave exposed pluggable pin portions of the apparatus.

The carrier frame 10 (FIG. 2) is the major structural member of the apparatus and consists of electrical insulating material, which may be a plastic, and which may be formed by well-known molding techniques. The carrier frame 10 may be provided with one or more channel-shaped sections. Preferably, the carrier frame 10 has an H-shaped configuration, as shown, thus providing two channel-shaped sections 22 and 24. In this configuration, the central rib 26 of the carrier frame 10 may be regarded as a base member common to the two channels 22 and 24. Accordingly, the channel 22 includes the rib 26 and outwardly extending substantially parallel legs 28 and 30. The channel 24 similarly includes the rib 26 and outwardly-extending substantially parallel legs 32 and 34.

Each of the four legs 28, 30, 32 and 34 is provided with two rows of elongate notches for receiving the wire leads of the electrical components 16. The notches in the four legs 28, 30, 32 and 34 are similar, therefore, a description of the notches in only one of the legs will be given.

Thus in the leg 32, for example, the notches are formed in two rows, one row consisting of notches 36 and the other row consising of notches 38. The notches 36 are longer than the notches 38. Also, the rows of notches 36 and 38 are interposed so that the notches of the two rows are arranged alternately side-by-side. The spacing between the center lines of adjacent notches in the interposed rows of notches 36 and 38, such as the spacing 40, for example (FIG. 10), is less than the cross-sectional dimension of the body portion of the electrical components 16. As will appear more fully hereinafter, for a given length and width of carrier frame 10, this construction of the notches in the several legs 28, 30, 32 and 34 makes it possible to package the electrical components 16 in greater numbers, or in greater density in the carrier frame 10.

The foldable developed sheet 12 (FIG. 3) comprises a base sheet of flexible electrical insulating material 42 provided with two sets of internal elongate openings 44 and 46. The four margins 48, 50, 52 and 54 of the sheet 12 are each provided with two rows of openings. Margin 48, for example, is provided with two rows of openings 56 and 58 which are in line with corresponding ones of the internal openings 44 and 46 and with similar marginal openings 60 and 62 in margin 50, all of which marginal openings are similarly constructed with regard to length and to spacing between adjacent openings as the notches in the legs 28, 30, 32 and 34 of the carrier frame 10. The margins 52 and 54 of the sheet 12 are each similarly provided with two rows of marginal openings 64 and 66, and 68 and 70, respectively, which also are similar with regard to length and to spacing between adjacent openings as the notches in the legs of the carrier frame 10. The openings 64 and 66 are in line with the openings 68 and 70.

Both sides of the sheet 12 are provided with flat flexible conductors bonded thereto and which may preferably be fabricated on the sheet by printed circuit techniques. Thus on the outer surface 72 of the sheet 12 there are provided a group of conductors 74, and on the opposite inner surface 76 of the sheet 12 there are provided a group of conductors 78. Certain of the conductors on one side of the sheet are electrically connected individually to a conductor on the other side of the sheet, as by means of conductive plating 80 on the surface of perforations which intercept the two conductors which are connected. Each of the conducors 74 has at least one of its terminal 74*a* abutting or adjacent to one of the internal elongate openings 44 or 46, or to one of the openings in the margins 48, 50, 52, or 54.

The flexible sheet 12 is folded about the carrier frame 10 and bonded to the carrier frame in a suitable manner so that it substantially covers at least the major surfaces of the carrier frame, and so that the internal openings 44 and 46 and marginal openings 56, 58, 60, 62, 64, 66, 68 and 70 are in line with corresponding ones of the notches, and so that the terminals 74*a* are positoined adjacent to the inner ends of the notches. FIGS. 4–8 illustrate consecutively the steps in one method of folding the sheet 12, in the process of folding it about the carrier frame 10. For simplicity, the conductors and openings have been omitted from the sheet 12 in these figures.

Figure 12:
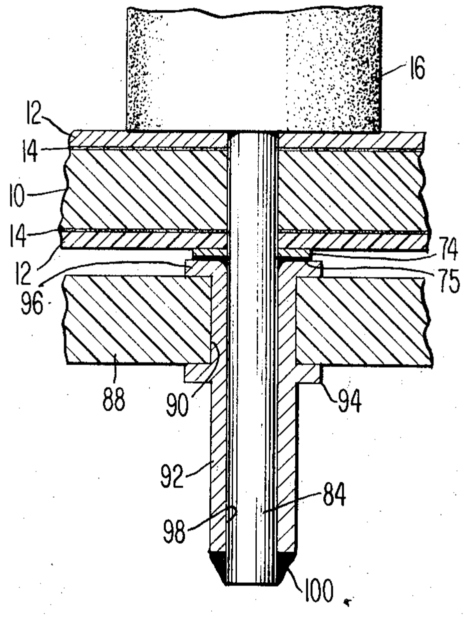

Preferably, the folded sheet 12 is bonded to the carrier frame 10 by means of an electrical insulating adhesive 14 (FIG. 12). The adhesive 14 may be applied in one way, for example, by spraying such adhesive in liquid form on the inside surface 76 of the sheet 12 prior to folding, and then, after permitting the adhesive 14 to dry, applying the adhesively coated sheet 12 to the carrier frame 10 by folding it about the carrier frame and then pressing it into place until the adhesive bonds the sheet to the carrier frame. Alternatively, both the carrier frame 10 and the inside surface 76 of the sheet 12 may be sprayed with adhesive and then, while one or both of the sheet 12 and carrier frame 10 are still tacky, the sheet 12 may be folded about the carrier frame and pressed into place. These methods of bonding the flexible sheet 12 to the carrier frame 10 are merely exemplary. Other methods may be used.

Thus, the carrier frame 10, together with the flexible sheet 12 adhesively bonded to it (FIG. 9) form a subassembly 82. Wire-leaded electrical components 16 are next inserted into the channels 22 and 24 and their leads electrically connected in any suitable manner, as by soldering, for example, to the appropriate terminals 74*a* adjacent to the associated carrier frame notches. Certain leads 83 of the electrical components 16 are short and extend into or slightly through the associated notch while other input and output leads 84 are longer and project outwardly a substantial distance through the associated notch in the channel leg.

Figure 10:
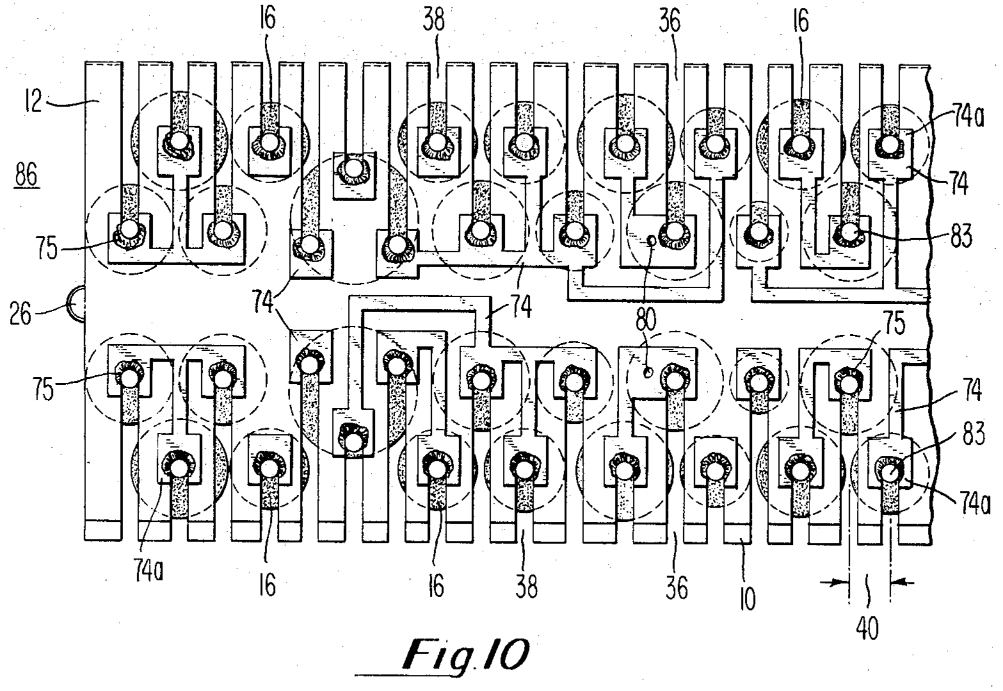
FIG. 10 is a fragmentary plan view of a subassembly of FIG. 1.

The channel shape, or the H shape of the subassembly 82 facilitates the operations of loading the electrical components 16 into the subassembly 82 and soldering their leads to the terminals 74*a*. Thus, the subassembly 82, including the carrier frame 10 and sheet 12, can be placed on the horizontal surface of a loading station, not shown, with the rib 26 in a horizontal position so that a row of electrical components 16 can be lowered from a hopper into the channel 22, for example, with their leads 83, 84 in the appropriate long notches, after which their leads can be connected to the associated terminals 74*a*, as by means of solder 75. A second row of electrical components 16 is then similarly loaded into the channel 22 with their leads in the appropriate short notches, and then these leads also soldered to the associated terminals 74*a*. This assembly can next be inverted and similar loading operations accomplished by inserting electrical components 16 into the channel 24 and similarly soldering their leads 83, 84 to the associated terminals 74*a*. Thus, the subassembly 82 together with the electrical components 16 inserted in place and electrically connected, constitute a second subassembly 86 (FIG. 10). By choosing suitable heat resistant materials for the several components of the subassembly 86, dip-soldering techniques can be used for connecting the leads to the terminals.

If desired, the subassembly 86 can be used, as is, as a final product, in which case the long leads 84, serving as input and output leads, can readily be plugged into, and electrically connected to, an associated apparatus such as, for example, a printed circuit board. Alternatively, the subassembly 86 may first be encased or encapsulated in an electrical insulating material so as to leave at least a portion of the leads 84 exposed, for plug-in insertion into associated apparatus. Also, if desired, the subassembly 86 may be connected to the pluggable header 18 (FIG. 9) and then the resulting assembly encapsulated with the electrical insulating encapsulating material 20 (FIG. 1), so that pluggable pin portions, shortly to be described, will be exposed.

Figure 11:
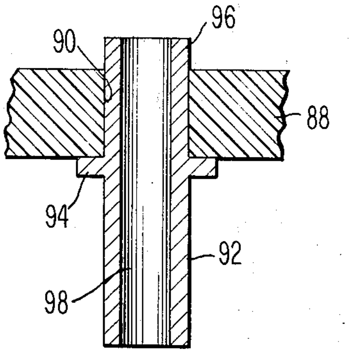
FIGS. 11–13 are fragmentary views of details.
Figure 13:
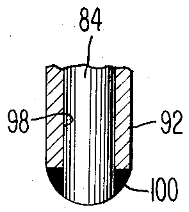

The pluggable header 18 (FIG. 9) includes a plate 88 of electrical insulating material (see also FIGS. 11 and 12) through which extend a number of holes 90. Hollow conductive pins 92 are inserted through the holes 90 until their shoulders 94 abut the plate 88. Short extensions 96 are then flared or peened over against the opposite surface of the plate 88 to lock the pins 92 to the plate. The subassembly 86 is then plugged into the header 18 so that each of the long input and output leads 84 passes into and preferably slightly through the axial bore 98 of its associated pin 92. The leads 84 are then electrically connected to the pins 92, as by means of solder 100. The soldered connections of the pins 92 to the leads 84 may then be dressed smooth or rounded, if desired (FIG. 13), to provide smooth pluggable pins 92. This final assembly may then be encapsulated in the material 20 (FIG. 1) so that a portion of each pluggable pin 92 is exposed, thereby providing an encased pluggable electrical module.

While there has been shown and described a particular electrical apparatus and a particular method of fabricating it to exemplify the principles of the invention, it is to be understood that this is but one form and but one method of the invention, and that the invention is capable of being constructed and practiced in a variety of forms and methods without departing from its true spirit and scope. Accordingly, the invention is not to be limited by the specific module and method disclosed.

We claim:

1. In electronic apparatus having a carrier frame for supporting electrical components having wire leads, and in which the frame has a channel-shaped section which comprises a base, legs extending from the base, and elongate notches in marginal edges of the legs for receiving the wire leads of said components, the improvement comprising a foldable sheet of electrical insulating material provided with a plurality of elongate openings and with flat conductors on both sides of the sheet, certain of said conductors having a terminal adjacent to one of said openings, means electrically connecting certain of the conductors on one side of the sheet individually to a conductor on the other side of the sheet, and means for bonding the sheet in a folded condition to said channel-shaped section so that it substantially covers at least some of the major surfaces of said channel-shaped section and so that said openings are in line with corresponding ones of said notches to thereby position said terminals adjacent to the notches for connection to the leads.

2. An improvement according to claim 1 characterized further in that certain of said elongate openings terminate at one end by opening out through a marginal edge of the sheet.

3. An improvement according to claim 1 characterized further in that certain of said elongate openings terminate at both ends within said sheet.

4. In electronic apparatus having an elongate substantially H-shaped carrier frame for supporting electrical components having wire leads, and in which the carrier frame comprises a rib portion, substantially parallel legs extending in substantially opposite directions from the rib portion, and elongate notches in each leg for receiving the wire leads of said components, the improvement comprising a flexible sheet of electrical insulating material provided with a plurality of elongate openings and with flat conductors on both sides of the sheet, certain of said conductors having a terminal adjacent to one of said openings, means electrically connecting certain of the conductors on one side of the sheet individually to a conductor on the other side of the sheet, and means for holding the sheet in a folded condition against the carrier frame so that it substantially covers the major surfaces of the carrier frame and so that said openings are in line with corresponding ones of said notches to thereby position said terminals for connection to the leads of said components to be inserted into said carrier frame.

5. An improvement according to claim 4 characterized further in that certain of said elongate openings terminate at one end by opening out through a marginal edge of the sheet.

6. An improvement according to claim 4 characterized further in that certain of said elongate openings terminate at both ends within said sheet.

7. An improvement according to claim 4 characterized further in that said electrical components have an elongate body portion, and in that said notches are arranged in two marginal rows in each said leg, the notches in one of said marginal rows of each leg having a different length than the notches in the other row of the same leg and each notch of one of the rows of each leg being interposed between a pair of notches of the other row of the same leg, the spacing between the center lines of adjacent notches in the interposed two marginal rows of each leg being less than the cross-sectional dimension of the body portion of said electrial components.

8. An electrical module comprising an elongate substantially H-shaped carrier frame comprising a rib portion, substantially parallel legs extending in substantially opposite directions from said rib portion to form two channels, and elongate notches in each leg, a flexible sheet of electrical insulating material provided with a plurality of openings certain of which terminate at one end by opening out through a marginal edge of the sheet and others of which terminate at both ends within said sheet, a plurality of flexible conductors on both sides of said sheet, certain of said conductors having a terminal adjacent to one of said openings, means electrically connecting certain of the conductors on one side of the sheet individually to a conductor on the other side of the sheet, means for holding the sheet in a folded condition agains the carrier frame so that it substantially covers the major surfaces of the carrier frame and so that said openings are in line with corresponding ones of said notches to thereby position said terminals adjacent to the notches, a plurality of wire-leaded electrical components mounted crosswise in said channels, certain of which have short leads extending into opposite notches in the associated channel legs and others of which have a short lead extending into a notch in one of the associated channel legs and a long lead projecting outwardly through a notch in the other leg of the associated channel, means electrically connecting said leads to the terminals at their associated notches, and a header member provided with pluggable pins each electrically connected to one of said projecting leads.

9. An electrical module according to claim 8 wherein each pluggable pin is provided with an axial bore, and each projecting lead extends into the axial bore of its associated pin.

References Cited

UNITED STATES PATENTS

| | | | |
|---|---|---|---|
| 3,151,277 | 9/1964 | Gray | 29—626 |
| 3,200,383 | 8/1965 | James | 29—604 |
| 3,340,437 | 9/1967 | Fricker. | |
| 3,384,956 | 5/1968 | Flanders et al. | |

ROBERT K. SCHAEFER, Primary Examiner

D. SMITH, Jr., Assistant Examiner

U.S. Cl. X.R.

29—626; 174—68.5